US012626394B2

(12) United States Patent
Lunayach et al.

(10) Patent No.: US 12,626,394 B2
(45) Date of Patent: May 12, 2026

(54) FAST SELF-SUPERVISED SINGLE IMAGE TO CATEGORICAL 3D OBJECTS MACHINE LEARNING MODEL TRAINING

(71) Applicants: TOYOTA RESEARCH INSTITUTE, INC., Los Altos, CA (US); GEORGIA TECH RESEARCH CORPORATION, Atlanta, GA (US)

(72) Inventors: Mayank Lunayach, Atlanta, GA (US); Sergey Zakharov, Menlo Park, CA (US); Dian Chen, Mountain View, CA (US); Rares Ambrus, San Francisco, CA (US); Zsolt Kira, Atlanta, GA (US); Muhammad Zubair Irshad, Atlanta, GA (US)

(73) Assignees: TOYOTA RESEARCH INSTITUTE, INC., Los Altos, CA (US); TOYOTA JIDOSHA KABUSHIKI KAISHA, Toyota (JP); GEORGIA TECH RESEARCH CORPORATION, Atlanta, GA (US)

( * ) Notice: Subject to any disclaimer, the term of this patent is extended or adjusted under 35 U.S.C. 154(b) by 263 days.

(21) Appl. No.: 18/585,908

(22) Filed: Feb. 23, 2024

(65) Prior Publication Data

US 2025/0272868 A1 Aug. 28, 2025

(51) Int. Cl.
$G06T\ 7/70$ (2017.01)
$G06T\ 7/50$ (2017.01)
(Continued)

(52) U.S. Cl.
CPC ................. G06T 7/70 (2017.01); G06T 7/50 (2017.01); G06T 7/62 (2017.01); G06V 10/44 (2022.01);
(Continued)

(58) Field of Classification Search
CPC .... G06T 7/70; G06T 7/50; G06T 7/62; G06T 2207/30252; G06T 2207/20081;
(Continued)

(56) References Cited

U.S. PATENT DOCUMENTS 10,650,278 B1 * 5/2020 Ho ......................... G06V 10/26
11,094,134 B1 * 8/2021 Fallin .................... G06T 15/506
(Continued)

FOREIGN PATENT DOCUMENTS

WO 2021167586 A1 8/2021

OTHER PUBLICATIONS

Peng et al., "Self-Supervised Category-Level 6D Object Pose Estimation with Deep Implicit Shape Representation," 36th AAAI Conference on Artificial Intelligence (AAAI-22), 2022, 36(2):2082-2090 (https://doi.org/10.1609/aaai.v3612.20104).
(Continued)

*Primary Examiner* — Michael S Osinski
(74) *Attorney, Agent, or Firm* — SHEPPARD, MULLIN, RICHTER & HAMPTON LLP; Daniel N. Yannuzzi

(57) ABSTRACT

Systems and methods are provided for implementing a multi-stage, ML model training process for autonomous or semi-autonomous driving. The multi-stage ML model training process comprises (1) 2D and 3D supervised losses during a synthetic data ML model training, (2) 2D supervised on real-world data, and (3) 3D self-supervised losses on real-world data. The improved ML training process may not rely on 3D object recognition with real-world 3D labeled data. Once the ML model is trained, in some examples, the trained ML model can implement an inference process to predict the 3D shape, size, and 6D pose of objects within a single image, operate at a category level, and eliminate the need for computer-aided design (CAD) models during inference.

20 Claims, 6 Drawing Sheets

(51) Int. Cl.

| | |
|---|---|
| *G06T 7/62* | (2017.01) |
| *G06V 10/44* | (2022.01) |
| *G06V 10/80* | (2022.01) |
| *G06V 20/70* | (2022.01) |

(52) U.S. Cl.
CPC ........... *G06V 10/806* (2022.01); *G06V 20/70* (2022.01); *G06T 2207/30252* (2013.01); *G06V 2201/07* (2022.01)

(58) Field of Classification Search
CPC .......... G06T 2207/20084; G06T 17/00; G06T 2207/10028; G06T 19/20; G06T 15/20; G06T 2207/10016; G06T 17/20; G06T 2207/30244; G06T 2207/30261; G06T 2219/2012; G06T 19/006; G06T 7/75; G06T 7/11; G06T 7/55; G06T 7/73; G06T 7/74; G06V 10/44; G06V 10/806; G06V 20/70; G06V 2201/07; G06V 10/82; G06V 20/64; G06V 10/774; G06V 10/764; G06V 20/56; G06V 20/647; G06V 10/26; G06V 10/454; G06V 20/58; G06N 3/045; G06N 3/08; G06N 3/0464; G06N 3/09; G06N 3/094; G06N 3/0475
See application file for complete search history.

(56) References Cited

U.S. PATENT DOCUMENTS

| | | | |
|---|---|---|---|
| 11,250,637 B1 | 2/2022 | Tan | |
| 11,462,023 B2 | 10/2022 | Kehl | |
| 11,715,251 B2 | 8/2023 | Tremblay | |
| 12,374,065 B1* | 7/2025 | Rethage | G06N 3/045 |
| 12,428,022 B2* | 9/2025 | Guizilini | B60W 60/001 |
| 12,462,417 B2* | 11/2025 | Rukhovich | G06T 15/10 |
| 12,475,725 B2* | 11/2025 | Goel | G06V 20/64 |
| 12,511,619 B2* | 12/2025 | Griffin | G06Q 10/087 |
| 2019/0317519 A1* | 10/2019 | Chen | G05D 1/0221 |
| 2020/0167941 A1* | 5/2020 | Tong | G01S 13/89 |
| 2020/0387698 A1* | 12/2020 | Yi | G06N 3/0455 |
| 2021/0118184 A1* | 4/2021 | Pillai | G06F 9/30196 |
| 2021/0166477 A1* | 6/2021 | Bunkasem | G06V 10/774 |
| 2021/0192762 A1* | 6/2021 | Guan | G06V 20/64 |
| 2021/0201565 A1* | 7/2021 | Dibra | G06T 7/00 |
| 2021/0374993 A1* | 12/2021 | Guay | G06T 7/74 |
| 2022/0044070 A1* | 2/2022 | Koh | G06T 17/00 |
| 2022/0171957 A1* | 6/2022 | Sahai | G06V 20/10 |
| 2022/0245398 A1* | 8/2022 | Atanasoaei | G06T 15/20 |
| 2023/0043409 A1* | 2/2023 | Afrasiabi | G06F 30/27 |
| 2023/0105331 A1* | 4/2023 | Cheng | G06F 18/24 345/419 |
| 2023/0112302 A1* | 4/2023 | Marks | G06T 19/20 345/419 |
| 2023/0121534 A1* | 4/2023 | Rukhovich | G06T 7/70 382/103 |
| 2023/0126366 A1* | 4/2023 | Liao | G06T 7/593 382/103 |
| 2023/0154032 A1* | 5/2023 | Sinha | G06T 7/70 382/103 |
| 2023/0154166 A1 | 5/2023 | Pauli | |
| 2023/0177849 A1 | 6/2023 | Ambrus | |
| 2023/0177850 A1 | 6/2023 | Ambrus | |
| 2023/0245396 A1* | 8/2023 | Xiong | G06V 10/26 345/423 |

| | | | |
|---|---|---|---|
| 2023/0351724 A1* | 11/2023 | Hou | G06V 20/46 |
| 2024/0005504 A1* | 1/2024 | Ribeiro | G06T 7/0014 |
| 2024/0020914 A1* | 1/2024 | Leroux | G06T 15/205 |
| 2024/0078797 A1* | 3/2024 | Azarian Yazdi | G06V 10/778 |
| 2024/0095937 A1* | 3/2024 | Unger | G06T 7/168 |
| 2024/0119746 A1* | 4/2024 | Liu | G06T 7/11 |
| 2024/0125899 A1* | 4/2024 | Khadem | G06V 20/588 |
| 2024/0135686 A1* | 4/2024 | Ju | G03B 19/16 |
| 2024/0144584 A1* | 5/2024 | Son | G06N 3/045 |
| 2024/0169560 A1* | 5/2024 | Jatesiktat | G06V 10/82 |
| 2024/0257451 A1* | 8/2024 | Wang | G06T 17/00 |
| 2024/0320304 A1* | 9/2024 | Atanasoaei | G06V 10/774 |
| 2024/0393804 A1* | 11/2024 | Tananaev | G06V 20/58 |
| 2025/0022151 A1* | 1/2025 | Yan | G06V 10/764 |
| 2025/0022289 A1* | 1/2025 | Sivaraman | G06T 7/50 |
| 2025/0061647 A1* | 2/2025 | Wang | G06T 17/00 |
| 2025/0139868 A1* | 5/2025 | Kim | G06T 7/62 |
| 2025/0166327 A1* | 5/2025 | Moss | G06F 3/011 |
| 2025/0182495 A1* | 6/2025 | Rashed | G06V 10/774 |
| 2025/0200781 A1* | 6/2025 | Lore | G06T 7/75 |
| 2025/0238950 A1* | 7/2025 | Wang | G06T 7/70 |
| 2025/0245917 A1* | 7/2025 | Rashed | G06T 7/13 |
| 2025/0385994 A1* | 12/2025 | Sato | H04N 13/111 |
| 2025/0391104 A1* | 12/2025 | Pandian Shanmuganathan | G06T 17/00 |
| 2025/0391158 A1* | 12/2025 | Yamao | G06V 10/7747 |

OTHER PUBLICATIONS

Irshad et al., "ShAPO: Implicit Representations for Multi-Object Shape, Appearance, and Pose Optimization," arXiv:2207.13691v1 [cs.CV], Jul. 27, 2022, 23 pages (https://doi.org/10.48550/arXiv.2207.13691).

Zhong et al., "SNAKE: Shape-aware Neural 3D Keypoint Field," 36th Conference on Neural Information Processing Systems (NeurIPS 2022), 2022, 13 pages (https://proceedings.neurips.cc/paper_files/paper/2022/file/2e3eccb54649186564ad6627ed80848c-Paper-Conference.pdf).

Yuan et al., "Bi3D: Bi-domain Active Learning for Cross-domain 3D Object Detection," IEEE/CVF Conference on Computer Vision and Pattern Recognition (CVPR 2023), Jun. 2023, pp. 15599-15608 (https://doi.org/10.1109/CVPR52729.2023.01497).

Tian et al., "Unsupervised Object Detection with LiDAR Clues," IEEE/CVF Conference on Computer Vision and Pattern Recognition (CVPR 2021), Jun. 2021, pp. 5958-5968 (https://doi.org/10.1109/CVPR46437.2021.00590).

Tsai et al., "See Eye to Eye: A Lidar-Agnostic 3D Detection Framework for Unsupervised Multi-Target Domain Adaptation," IEEE Robotics and Automation Letters, 7(3):7904-7911, Jun. 23, 2022 (https://doi.org/10.1109/LRA.2022.3185783).

Irshad et al., "CenterSnap: Single-Shot Multi-Object 3D Shape Reconstruction and Categorical 6D Pose and Size Estimation," accepted to IEEE International Conference on Robotics and Automation 2022, Mar. 3, 2022, 9 pages (https://doi.org/10.48550/arXiv.2203.01929).

Manhardt et al., "CPS++: Improving Class-level 6D Pose and Shape Estimation From Monocular Images With Self-Supervised Learning," arXiv:2003.05848v3 [cs.CV], Sep. 11, 2020, 18 pages (https://doi.org/10.48550/arXiv.2003.05848).

Wang et al., "Normalized Object Coordinate Space for Category-Level 6D Object Pose and Size Estimation," 2019 IEEE/CVF Conference on Computer Vision and Pattern Recognition (CVPR), Jun. 18, 2019, pp. 2642-2651 (https://doi.org/10.1109/CVPR.2019.00275).

* cited by examiner

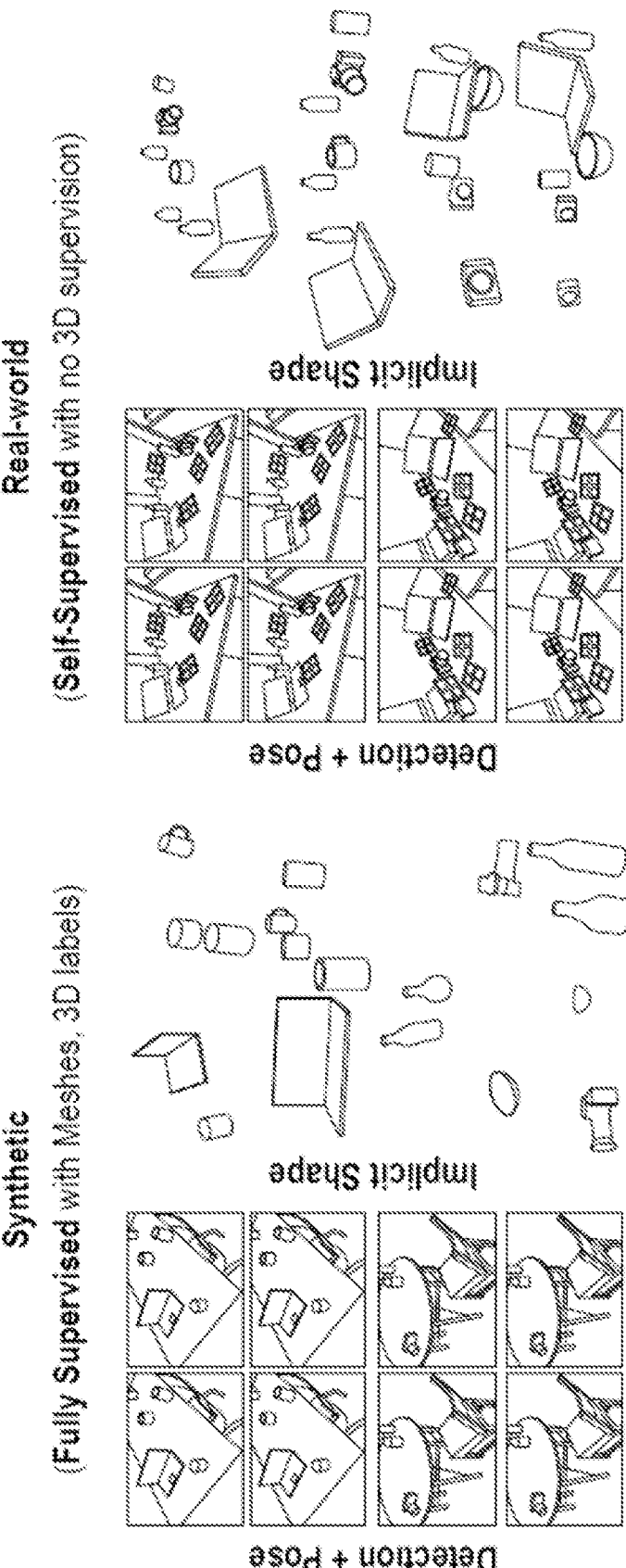
FIG. 3

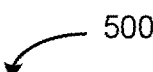

500

RECEIVE AN IMAGE CORRESPONDING WITH AN AUTONOMOUS VEHICLE 510

INITIATE A MULTI-STEP TRAINING OF A MACHINE LEARNING MODEL ON THE IMAGE 520

INITIATE A FIRST STAGE PRE-TRAINING, SECOND STAGE MIXED-TRAINING, AND THIRD STAGE FINE-TUNING 530

EXTRACT AND FUSE FEATURES FROM THE IMAGE, USING A BACKBONE NETWORK, BY EXPOSING THE IMAGE TO A HEATMAP HEAD, A SEGMENTATION HEAD, A POSE HEAD, AND A SHAPE HEAD 540

BUS 602

PROCESSOR 604

MAIN MEMORY 608

STORAGE MECHANISM 610

MEDIA DRIVE 612

STORAGE MEDIA 614

STORAGE UNIT I/F 620

STORAGE UNIT 622

COMM I/F 624

CHANNEL 628

FAST SELF-SUPERVISED SINGLE IMAGE TO CATEGORICAL 3D OBJECTS MACHINE LEARNING MODEL TRAINING

CROSS-REFERENCE TO RELATED APPLICATION

This patent application is co-pending with U.S. patent application Ser. No. 17/895,224, filed Aug. 25, 2022, which is incorporated by reference herein.

TECHNICAL FIELD

The present disclosure relates generally to shape reconstruction and pose and size estimation and, more particularly, to multi-object three-dimensional (3D) shape reconstruction and six-dimensional (6D) pose and size estimation from a single image for machine learning and robotics automation.

DESCRIPTION OF RELATED ART

Automated driving systems and robotics systems leverage 3D object recognition to help understand the surrounding environment. The goal is to enable a machine to perceive and interpret the 3D spatial information of objects in its vicinity, such as other vehicles, pedestrians, cyclists, and obstacles to help make informed operating decisions and ensure safe navigation. 3D object reconstruction enables these systems to obtain a fine-grained understanding of local geometry, which may be useful in scenarios such as robotics grasping. Furthermore, a system that is able to perform 6D pose estimation in real-time can lead to fast-feedback control.

BRIEF SUMMARY OF THE DISCLOSURE

According to various examples of the disclosed technology, a method for training a machine learning (ML) model to recognize objects. The objects may be encountered by an autonomous or semi-autonomous vehicle is operating in an environment, or other instances of object recognition implemented by a machine learning model. The method may comprise, for example, receiving an image corresponding with the autonomous or semi-autonomous operations of the vehicle and initiating a multi-step training of the machine learning model on the image. The multi-step training of the machine learning model may comprise initiating a first stage pre-training process based on synthetic data using two-dimensional (2D) supervised machine learning (ML) model training and three-dimensional (3D) self-supervised machine learning (ML) model training, following the first stage pre-training process, initiating a second stage mixed-training process based on a combination of the synthetic data and real-world data on the 2D supervised ML model training, following the second stage mixed-training process, initiating a third stage fine-tuning process based on the real-world data without the synthetic data on the 3D self-supervised ML model training, and extracting and fusing features from the image, using a backbone network, by exposing the image to a heatmap head, a segmentation head, a pose head, and a shape head.

In some examples, the image is a first image and, in some examples, upon training the machine learning model on the first image, the machine learning model is provided with an inference process on a set of objects in a second image. The inference process may comprise detecting 2D locations of the set of objects in the second image, predicting a 3D shape of an object in the set of objects, predicting a pose of the object in the set of objects, predicting a size of the object in the set of objects, and adjusting operation of the vehicle based on the inference.

In some examples, a loss is calculated at each of the first stage pre-training process, the second stage mixed-training process, and the third stage fine-tuning process of the multi-step training of the machine learning model associated with two-dimensional (2D) data loss and a three-dimensional (3D) data loss. The loss may use a chamfer loss aggregated with the 2D data loss and the 3D data loss. The shape head may use, for example, a chamfer loss aggregated with the 2D data loss and the 3D data loss.

In some examples, during the second stage mixed-training process and the third stage fine-tuning process, 2D labels from the real-world data may be employed without 3D labels.

In some examples, a ratio of synthetic data in the first stage pre-training process to real-world data during the second stage mixed-training process is adjustable and predetermined.

In some examples, synthetic data is determined using a learned continuation Signed Distance Function (SDF) representing shapes of different categories.

In some examples, the image is a RGB-D image. The RGB-D image may include multiple objects for detecting, reconstructing, and initiating an action by the system/vehicle described herein.

Other features and aspects of the disclosed technology will become apparent from the following detailed description, taken in conjunction with the accompanying drawings, which illustrate, by way of example, the features in accordance with examples of the disclosed technology. The summary is not intended to limit the scope of any inventions described herein, which are defined solely by the claims attached hereto.

BRIEF DESCRIPTION OF THE DRAWINGS

The present disclosure, in accordance with one or more various examples, is described in detail with reference to the following figures. The figures are provided for purposes of illustration only and merely depict typical or examples.

FIG. 3 illustrates output from the inference process executed by the trained model, in accordance with various examples of the technology described herein.

FIG. 5 is an example process that may be used to implement various features of examples described in the present disclosure.

Figure 1:
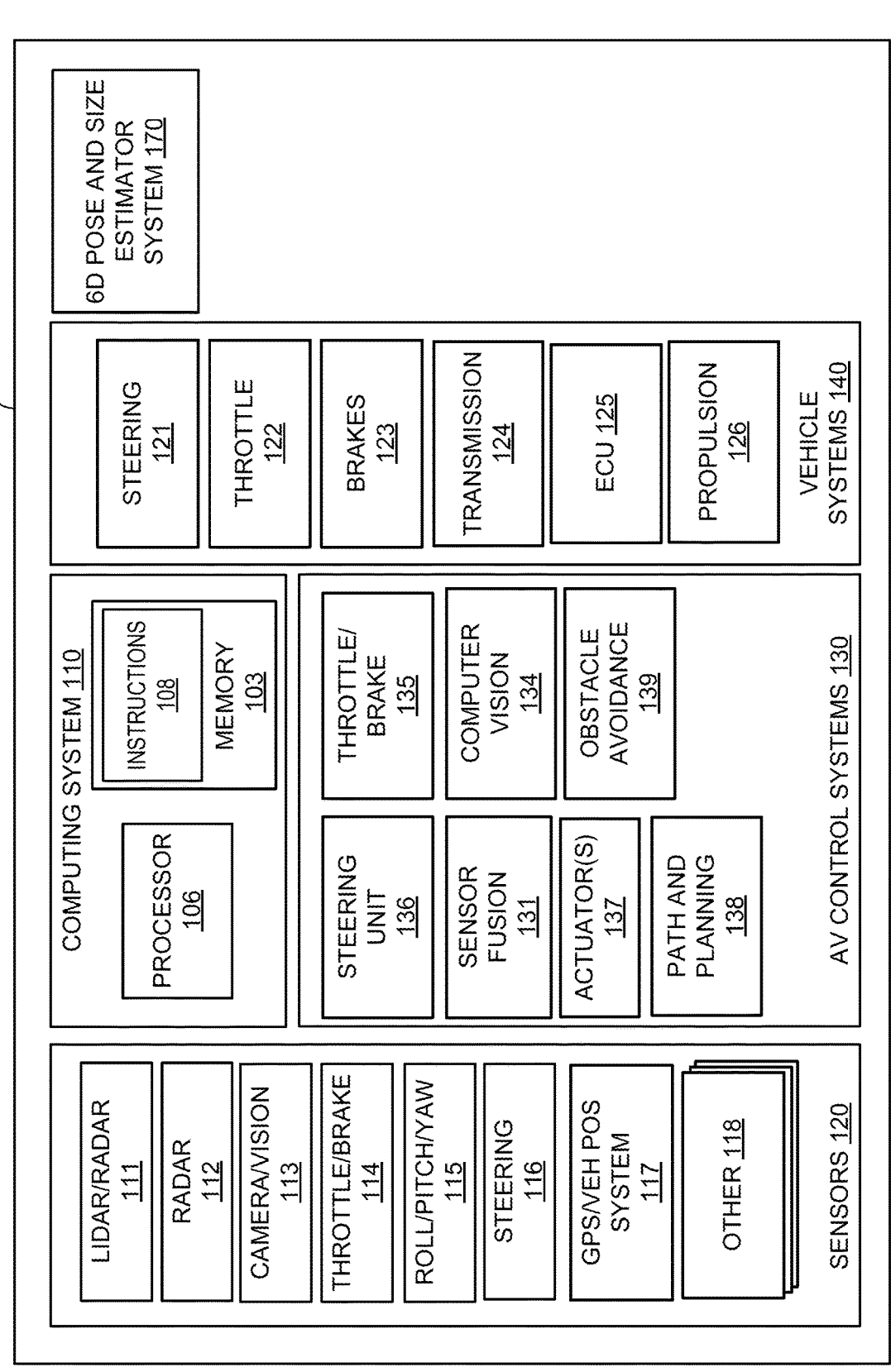
FIG. 1 illustrates an example architecture which can be used to implement object recognition for autonomous or semi-autonomous driving, in accordance with systems and methods described herein.

The figures are not exhaustive and do not limit the present disclosure to the precise form disclosed.

DETAILED DESCRIPTION

Existing autonomous or semi-autonomous driving methods rely on 3D object recognition to help understand the surrounding environment. The goal is to enable a vehicle to perceive and interpret the 3D spatial information of objects in the vehicle's vicinity, such as other vehicles, pedestrians, cyclists, and obstacles to help make informed operating decisions and ensure safe navigation. However, these 3D object recognition systems often suffer from inefficiencies arising from image processing, reliance on separate machine learning (ML) models for different object categories, and slow surface extraction during the training process of implicit reconstruction models. Each of these inefficiencies, individually and as a whole, can hinder the speed and real-world applicability of the 3D recognition process for various uses, including when the process is implemented for autonomous or semi-autonomous driving, automation of robotic devices, or other uses for categorical recognition of 3D objects.

Examples of the system described herein implements a multi-stage, ML model training process. The multi-stage ML model training process comprises (1) two-dimensional (2D) and three-dimensional (3D) supervised ML model training and losses based on synthetic data, (2) 2D supervised ML model training and losses based on a combination of the synthetic data and real-world data, and (3) 3D self-supervised ML model training and losses based on real-world data (e.g., exclusively real-world data without synthetic data). During the second stage and the third stage, 2D labels from the real-world data may be employed without 3D labels. To account for no direct 3D supervision from real-world data, the 3D self-supervision process may use a chamfer loss. Specifically, a pseudo ground truth for point clouds may be determined by back-projecting the input depth maps into the 3D space. These estimated point clouds serve as a supervision mechanism for guiding the predicted point clouds. Additionally, the training process may not rely on 3D object recognition with real-world 3D labeled data. Once the ML model is trained, the trained ML model can implement an inference process to predict the 3D shape, size, and 6D pose of objects within a single image, operate at a category level, and eliminate the need for computer-aided design (CAD) models during inference.

In some examples, the system can estimate 6D pose, 3D shape, and size of all the seen object instances in an image without requiring real-world 3D labels to train the ML model. It performs object detection, localization, and 3D reconstruction. All three steps may be initiated sequentially (e.g., end-to-end, where detection to 3D prediction happen in one forward pass) without any post-processing. For synthetic image data, the system may determine images using a learned continuous Signed Distance Function (SDF) representing shapes of different categories. The training during the first stage may be implemented at a vehicle/device or offline. The training may use a shape decoder. Then the decoder may be frozen or otherwise stored and is used to recover the implicit object shape using predicted latent codes and query points contained in a unit cube.

The system may comprise a backbone network that extracts and fuses features from the image (e.g., a single RGB-D image), which are processed by task-specific heads to get dense predictions of heatmap head, segmentation head, pose head, and shape head. The system may initiate a forward pass and use the output to initiate fast batched surface extraction. The system may initiate a multi-stage 3D training process and self-supervised loss determination to aid the effective transfer of fully supervised synthetic domain learning to real-world domain without requiring 3D labels.

Technical improvements are described throughout the disclosure. For example, traditional ML models often suffer from inefficiencies arising from non-end-to-end processing, reliance on separate models for different object categories, and slow surface extraction during the training of implicit reconstruction models. These and other inefficiencies can hinder both the speed and real-world applicability of the 3D recognition process, including applications to autonomous and semi-autonomous driving. Additionally, various traditional training methods rely on 3D labeled real-world data and uses post-optimization after training (resulting in less efficient processing times). In other examples, traditional methods combine multiple models for inference, which results in an overall delay. The described methods can provide end-to-end inference predictions (e.g., detection and 3D prediction happen in one forward pass) and utilize a single trained ML model for all categories.

The systems and methods disclosed herein may be implemented with any of a number of different autonomous or semi-autonomous vehicles and vehicle types, or in devices outside of the driving environment. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

FIG. 1 illustrates an example architecture which can be used to implement object recognition for autonomous or semi-autonomous driving, in accordance with systems and methods described herein. In this example, vehicle 100 includes a computing system 110, sensors 120, AV control systems 130, vehicle systems 140, and 6D pose and size estimator system 170. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 118 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

In some examples, the ML model may be trained by 6D pose and size estimator system 170 located at the vehicle 100. When an ML model is trained outside of the vehicle, the trained machine learning model may be transmitted to vehicle 100, and the trained machine learning model may be implemented for operation in, for example, computer vision module 134, pathing module 138, and obstacle avoidance module 139.

Vehicle systems 140 may include a plurality of different systems/subsystems to control operation of vehicle 100. In this example, AV control systems 130 include steering system 121, throttle system 122, brakes 123, transmission 124, electronic control unit (ECU) 125, and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

6D pose and size estimator system 170 may be implemented partially within vehicle 100 and as a cloud-based service. For example, in one approach, functionality associated with at least one module of the 6D pose and size estimator system 170 is implemented within vehicle 100, while further functionality is implemented within a cloud-based computing system. 6D pose and size estimator module 170 is configured to simultaneously detect, reconstruct, and localize objects in a 3D space given an RGB-D image as input, and further described in FIG. 2.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
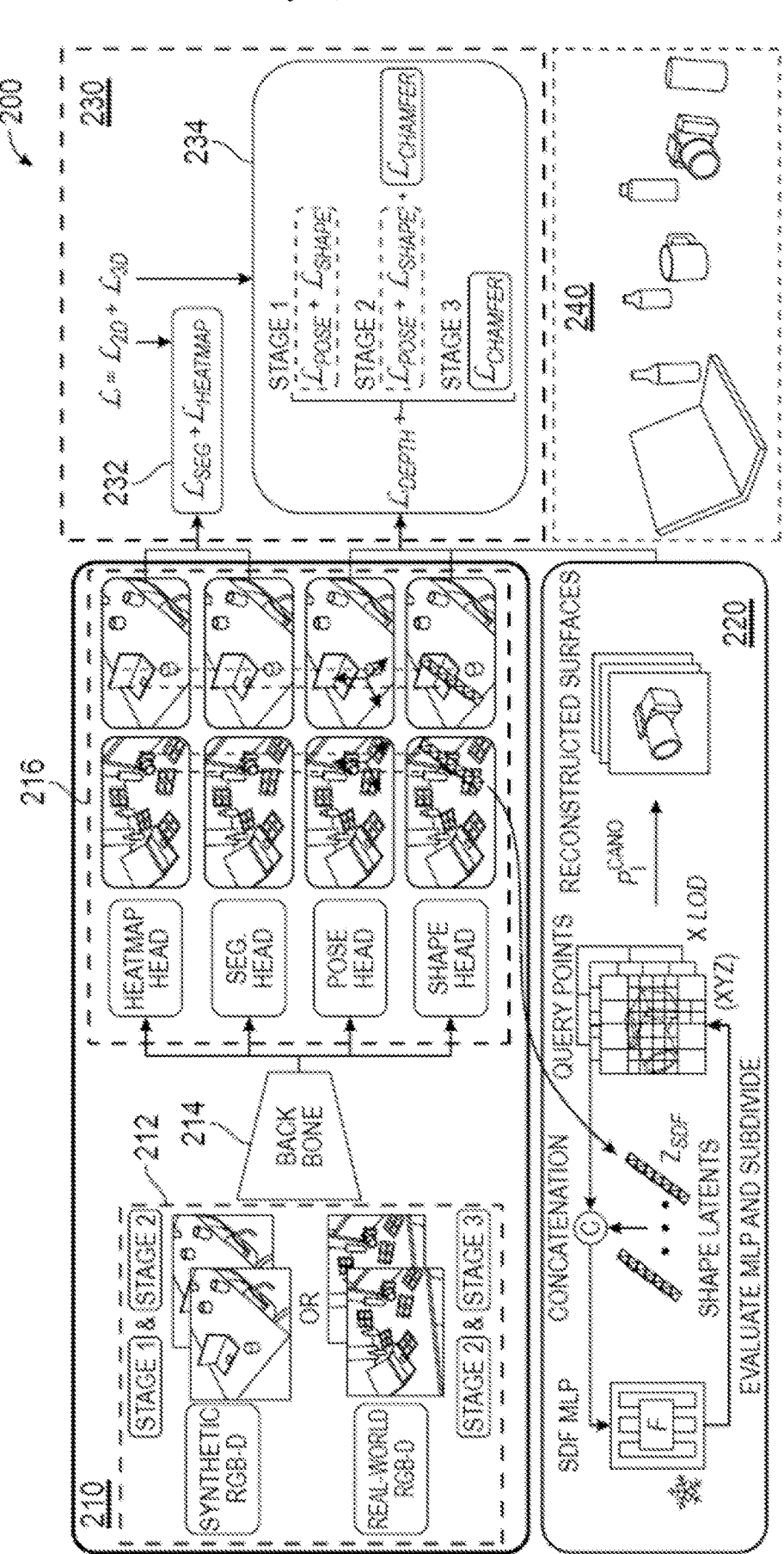
FIG. 2 is an illustrative training process for a machine learning model, in accordance with various examples of the technology described herein.

FIG. 2 illustrates an example high-level overview of a process 200 performed by 6D pose and size estimator system 170. For example, 6D pose and size estimator system 170 may receive an RGB-D image that includes multiple objects for detecting, reconstructing, and initiating an action by vehicle 100 illustrated in FIG. 1, where the detection and analysis of the image may help operate the vehicle or other robotic device.

At block 210, 6D pose and size estimator system 170 observes an input image that comprises objects and infers each object in the image by a respective 2D location using a multi-stage, ML model training process. For example, heatmaps may be generated from the input image where each detected point denotes the local maxima in the heatmap. The objects in the image may comprise various object attributes, encompassing 3D shape, 6D pose (e.g., orientation and position), size, and visual appearance of individual object instances, each of which may be used to infer characteristics and parameters of the objects in the image.

During the initial input process, at block 212, 6D pose and size estimator system 170 may implement the multi-stage, ML model training process. The multi-stage ML model training process comprises (1) 2D and 3D supervised ML model training and losses based on synthetic data, (2) 2D supervised ML model training and losses based on a combination of the synthetic data and real-world data, and (3) 3D self-supervised ML model training and losses based on real-world data (e.g., exclusively real-world data without synthetic data). During the second stage and the third stage, 2D labels from the real-world data may be employed without 3D labels.

In the first stage, given an RGB-D image $I \in \mathbb{R}^{h \times w \times 3}$ and depth map $D \in \mathbb{R}^{h \times w}$, 6D pose and size estimator system 170 can infer the 6D pose $\tilde{P} \in SE(3)$, 1D scale $\tilde{T} \in \mathbb{R}^1$ and 3D shape (as SDF) for each detected object in the RGB-D image. The RGB-D image may comprise a H×W×3 matrix for the RGB image for the current frame and the depth may comprise a H×W matrix for the depth image for the current frame (e.g., in absolute space). In some examples, the synthetic data is generated using a signed distance function (SDF). The SDF may correspond with a mathematical function that associates each point in space with the signed distance to the nearest surface or boundary of an object or a shape. The distance may be a positive or negative value, depending on whether the point is inside or outside the object.

In some examples, the synthetic data may be received with 3D labels from an external source (e.g., the CAMERA dataset). Using the 3D labels that the synthetic data comes with, 6D pose and size estimator system 170 may not be separately configured to determine the 3D labels. The reuse of 3D labels in the synthetic data may help increase the efficiency of the processing and reduce the processor time for these training tasks, allowing the processor to execute other instructions faster.

In some examples, the first stage pre-training process may correspond with an objective corresponding with the determination of the loss during the first stage of training as shown: $\mathcal{L}_{pretrain} = \mathcal{L}_{seg} + \mathcal{L}_{depth} + \mathcal{L}_{heatmap} + \mathcal{L}_{pose} + \mathcal{L}_{shape}$ In some examples, a loss is calculated at each of the first stage pre-training process, the second stage mixed-training process, and the third stage fine-tuning process of the multi-step training of the machine learning model associated with two-dimensional (2D) data loss and a three-dimensional (3D) data loss. Additional detail on calculating loss is described in at least at blocks 230-234 and throughout the disclosure.

At the second stage mixed-training process, synthetic data and real-world data are used to train the ML model. During the mixed training, each batch of inputs may comprise a combination of real and synthetic data. While synthetic data points come with 3D labels, real-world data points may not come with the 3D labels. This design may help ensure that the ML model retains the 3D priors acquired during the first stage pre-training process (e.g., using synthetic data) while continuing to train and adapting to the nuances of real-world data.

In some examples, directly transitioning from synthetic pre-training (corresponding with the "first stage" in the present disclosure) to fine-tuning on real-world data (corresponding with the "third stage" in the present disclosure) can lead to undesirable effects. For example, the system may not use 3D priors due to the absence of explicit 3D supervision in real-world data. In another example, the system may overfit on the real-world data without meaningful learning for the ML model.

In some examples, the ratio of synthetic data in the first stage pre-training process to real-world data during the second stage mixed-training process is adjustable and predetermined. For example, the ratio of synthetic data to real-world data may be set to "5." Specifically, for a sample "b" in a mixed batch "B," total loss may correspond with the following formula:

$$\mathcal{L}_{mixed} =$$

$$\mathcal{L}_{seg} + \mathcal{L}_{depth} + \mathcal{L}_{heatmap} + \mathbb{1}(b \in syn)(\mathcal{L}_{pose} + \mathcal{L}_{shape}) + \mathbb{1}(b \in \text{real})\mathcal{L}_{chamfer}$$

where $\mathbb{1}(b \in syn)$ denotes if the sample b is synthetic and $\mathbb{1}(b \in \text{real})$ denotes if the sample b is real. To better facilitate learning from two different data distributions, batch normalization with fixed mean and variance (learnt during the first stage pre-training) is used.

The image may originate from a synthetic image dataset or a real image dataset. For the synthetic image dataset, the dataset may comprise numerous synthetic images (e.g., more than 300,000 images) with 3D annotations. In some examples, the synthetic images may be associated with the 3D annotations using a Normalized Object Coordinate Space (NOCS). The synthetic images may be associated with correspondence from observed pixels to NOCS, along with other object information such as class label and instance mask, in order to generate the 3D annotations of the dataset used to train the model/network. The predictions may be combined with a depth map to jointly estimate the metric 6D pose and dimensions of multiple objects in the image. Additionally, in some examples, the predictions and 3D annotations that the dataset comes with may be separate and distinct from the 6D pose and sizes that are generated by the system (e.g., 6D pose and size estimator system 170) using, for example, the pose head and various other head networks incorporated with the system architecture described herein.

In the third stage fine-tuning process, the training may be implemented exclusively on the real-world data, allowing the model to refine and fine-tune its understanding of real-world 3D structures. In some examples, the fine-tuning on the real-world data relies solely on 2D labels from the real-world data set. The loss objective for the third stage fine-tuning process may be:

$$\mathcal{L}_{finetune} = \mathcal{L}_{seg} + \mathcal{L}_{depth} + \mathcal{L}_{heatmap} + \mathcal{L}_{chamfer}$$

At block 214, a backbone network is implemented. The backbone network may be based on feature pyramid networks, for example, a Resnet18-FPN backbone, to extract features from the input image and produce feature maps at different levels of resolution. In some examples, the backbone network extracts and fuses features from the RGB-D input to generate the feature maps. The feature maps at the lower level contain more accurate spatial information due to their high resolution, while the feature maps at the higher level have more semantic information than the lower level data, due to their large receptive field.

In some examples, the backbone may implement various head networks to perform different tasks, as illustrated in block 216. The task-specific heads may to generate predictions using multiple methods, including a heatmap head, a segmentation head, a pose head, and a shape head. 6D pose and size estimator system 170 utilizes the maps, which are jointly optimized to predict of heatmap, shape, pose, and category scores for the objects in the image in a single forward pass.

The heatmap head determines heatmaps of the objects in the input. In some examples, the heatmap generated by heatmap head is based upon a feature pyramid, where the heatmap includes peaks and non-peaks and where the peaks correspond to centers of the objects in the RGB-D image. The object 2D centers may be predicted as heatmaps $$\hat{H} \in [0, 1]^{\frac{h}{R} \times \frac{w}{R} \times 1}$$

by the heatmap head, where each local maxima in the heatmap $\hat{H}$ becomes the detected point ($\hat{x}_i$, $\hat{y}_i$). L2 loss $\mathcal{L}_{heatmap} = \sum_{xy} (\hat{H} - H)^2$ is applied to supervise the heatmap head where ground truth heatmaps H are constructed from 2D coordinates with Gaussian kernels. R may correspond with the down-sampling factor of the backbone (in block 214).

The segmentation head determines the segmentation mask of the objects in the input. The segmentation mask is determined, at least in part, using a pixel-by-pixel analysis. For example, for each pixel on the image, the model outputs a multi-dimensional float prediction. The dimension of the prediction may correspond with the total possible number of object categories in the dataset. Each float prediction corresponding to a category may be the probability of that particular pixel belonging to that category. The predicted category for the particular pixel is estimated by finding the object category having the maximum probability. The segmentation head may be trained using the ground truth or estimated segmentation masks. Using the segmentation head, the model is trained and learns to reason about semantic information present in the image and is able to differentiate among different categories.

In some examples, the heatmap head and segmentation head may, together, predict the categories and 2D centers for objects in the input image. For n categories, the segmentation head predicts an (n+1) channel logit map (e.g., as an extra channel for the background class). The prediction may correspond with the formula $$\hat{M} \in \mathbb{R}^{\frac{h}{R} \times \frac{w}{R} \times 1},$$

which may be supervised with the ground truth instance masks.

The pose head determines the pose/positions of the objects in the input. For example, the pose head may predict a pose map $z_{pose}$ $$\in \mathbb{R}^{\frac{h}{R} \times \frac{w}{R} \times 13}.$$

The shape head determine the shapes of the objects in the input. For example, the shape map $z_{shape}$ $$\in \mathbb{R}^{\frac{h}{R} \times \frac{w}{R} \times D}.$$

The dimension "D" may correspond with "64" of the shape latent embedding.

In some examples, the pose head and shape head may be executed in parallel with the heatmap head and segmentation head. For each instance, shape and pose embeddings are queried using the predicted object centers from the heatmap Ĥ as follows:

$$z_{sdf_i} = z_{shape}[x_i, y_i, :]; sRT_i = z_{pose}[x_i, y_i, :] \tag{1}$$

where $(x_i, y_i)$ is one of N predicted object centers in, and Ĥ is the number of instances detected by the model in the given input.

In some examples, the pose head and shape head may be supervised during the first stage and the second stage (at block 212) using synthetic data, where L1 losses of pose and shape embedding are calculated between the ground truth and estimated values. These values may be weighted by the estimated heatmap Ĥ.

Other heads may be implemented, like a depth head. In some examples, the process may supervise a depth head with an auxiliary depth loss. To help remove noisy artifacts, the same noise may be added to the synthetic data and try to recover the depth values. This may enhance the performance transfer from synthetic to real.

At block 220, a point sampling process may be used with the shape head from block 216. In some examples, shape head may implement an octree-based point sampling method or a batched differentiable shape extraction process. The shape decoder may be pre-trained. The point cloud in the camera frame is estimated as $\mathcal{P}_i^{cam} = (sRT_i)\mathcal{P}_i^{cano}$.

When provided with query points $q_i$ and their corresponding signed distance values $S_i$. By computing signed distance functions (SDFs) with respect to their locations, the system can calculate the normal vector at each surface point during a reverse pass using the following formula:

$$n_i = \frac{\partial f(q_i; z)}{\partial q_i}$$

In some examples, the values in the normal vectors point toward the nearest surface, and signed distance values provide distance information to the surface. The values provided in the normal vectors and the signed distance values may enable a mapping of the query location to a 3D surface position denoted as $p_i$ in the following formula:

$$p_i = q_i - \frac{\partial f(q_i; z_{sdf_i})}{\partial q_i} f(q_i; z_{sdf_i}). \tag{2}$$

In some examples, recursive point sampling may be implemented where the batch of concatenated 3D points and latent vectors are evaluated for SDF using a frozen shape auto-decoder. The recursive point sampling may help to efficiently extract surface points for predicted objects associated with their respective latent vectors.

In some examples, the recursive point sampling may define a coarse voxel grid and computing SDF values for each point using the trained SDF network. Voxels with SDF values exceeding the voxel grid size for the current resolution level may be discarded. The remaining voxels may be subdivided to generate new voxels in each iteration (e.g., eight new voxels). This process continues until reaching the predetermined resolution level. In some examples, the process may be initiated at level of detail (LoD) equal to "1" and progress to LoD equal to "6." Once completed, the process may extract the point coordinates and corresponding SDF values and normals, projecting them onto the object surface using the previously described iso-surface projection procedure.

In some examples, to recover shapes for multiple objects concurrently, the system may implement an extraction algorithm. Since different objects may have distinct shapes, the system may traverse a single octree structure encompassing all predicted objects. This involves initializing a coarse grid for each predicted latent vector and collectively traversing them while monitoring boundaries that separate points belonging to different objects. Upon reaching the final LoD, the system may extract point clouds for each object based on established boundaries.

In some examples, query points are determined. Latent code $z_{sdf_i}$ for each instance is provided by the SDF-based auto-decoder to determine the predicted point cloud in the canonical space $\mathcal{P}_i^{cano}$.

At block 230, the loss is determined using a loss formula $L = L_{2D} + L_{3D}$. In some examples, implicit fields are used to determine loss along with a fast octree-based sampling to help decode shapes for self-supervised loss during training.

At block 232, 2D loss is calculated using the loss associated with the segmentation head and the loss associated with the heatmap head (at block 216). For example, the losses associated with the segmentation head and heatmap head may be aggregated to determine the total 2D loss.

At block 234, 3D loss is also calculated using the loss associated with the pose head and the loss associated with the shape head (at block 216). For example, the loss determined by a depth head may be aggregated with various 3D losses, including the losses associated with the pose head and shape head, the losses associated with the pose head, shape head, and chamfer loss, or the loss associated only with the chamfer loss, to determine the total 3D loss.

Chamfer loss may be determined. For example, to account for no direct 3D supervision from real-world data, the system may determine a pseudo ground truth for point clouds by back-projecting the input depth maps into 3D space. These estimated point clouds may serve as a loose supervision mechanism for guiding the predicted point clouds.

Chamfer loss may be computed between the estimated point cloud from scale, pose, and SDF and the ground-truth point cloud. For each instance, similar to [34], a point cloud of the visible points $\mathcal{P}_i^{real}$ is lifted from the input depth map D using the camera intrinsic values corresponding to K. The estimated point cloud may be calculated from $\mathcal{P}_i^{cam} = (s\,RT_i)\mathcal{P}_i^{canc}$. Typical chamfer loss calculates distance between all pairs of points the two point clouds. However, the depth-lifted point clouds are noisy and prone to outliers. Therefore, to make it robust to noises, the chamfer loss may be calculated when the loss of two points are less than e units apart. This chamfer loss determination may use a threshold value to determine the loss. For example:

$$\mathcal{L}_{chamfer} = \frac{1}{N_p} \sum_{p_j \in \mathcal{P}_i^{real}} \max\left(0, \epsilon - \min_{p_k \in \mathcal{P}_i^{cam}} \|p_j - p_k\|_2\right) +$$

$$\frac{1}{N_p} \sum_{p_j \in \mathcal{P}_i^{cam}} \max\left(0, \epsilon - \min_{p_k \in \mathcal{P}_i^{real}} \|p_j - p_k\|_2\right)$$

where $\epsilon > 0$ and Np is the total number of points satisfying $\|p_j - p_k\|_2 \le \epsilon$, $\forall p_j \in \mathcal{P}_i^{real}$ and $\forall p_k \in \mathcal{P}_i^{cam}$. To stabilize the convergence, $\mathcal{P}_i^{cano}$ is detached from the gradient computation graph.

At block 240, the set of objects from the input image may be reconstructed to include 6D pose, and size estimations. For example, 6D pose and size estimator system 170 jointly optimizes for detection, reconstruction, and localization. For instance, 6D pose and size estimator system 170 minimizes a loss for 2D and 3D detection. In some examples, the reconstructed image may help vehicle 100 or other robotic device navigate in an environment by identifying and reacting to the objects that are detected.

In some examples, 6D pose and size estimator system 170 may help train a machine learning model based upon the computer simulation, real-world data, or a combination of both. For instance, as the 6D poses of the simulated versions of the objects are known, the 6D pose and size estimator system 170 (or another system) can realistically manipulate the simulated version of the objects within the computer simulation. In other examples, vehicle 100 or other robotic device can utilize the machine learning model to navigate about a real-world environment.

FIG. 3 illustrates output from the inference process executed by the trained model, in accordance with various examples of the technology described herein. In example 300, output from the inference process executed by the trained model, which was trained on synthetic data and real-world data. For synthetic image data, images may be generated using a signed distance function (SDF). The SDF may correspond with a mathematical function that associates each point in space with the signed distance to the nearest surface or boundary of an object or a shape. The distance may be a positive or negative value, depending on whether the point is inside or outside the object. In some examples, the synthetic data may be received with 3D labels from an external source (e.g., the CAMERA dataset). For real-world data, images may be generated using a self-supervised process without 3D supervision.

Figure 4:
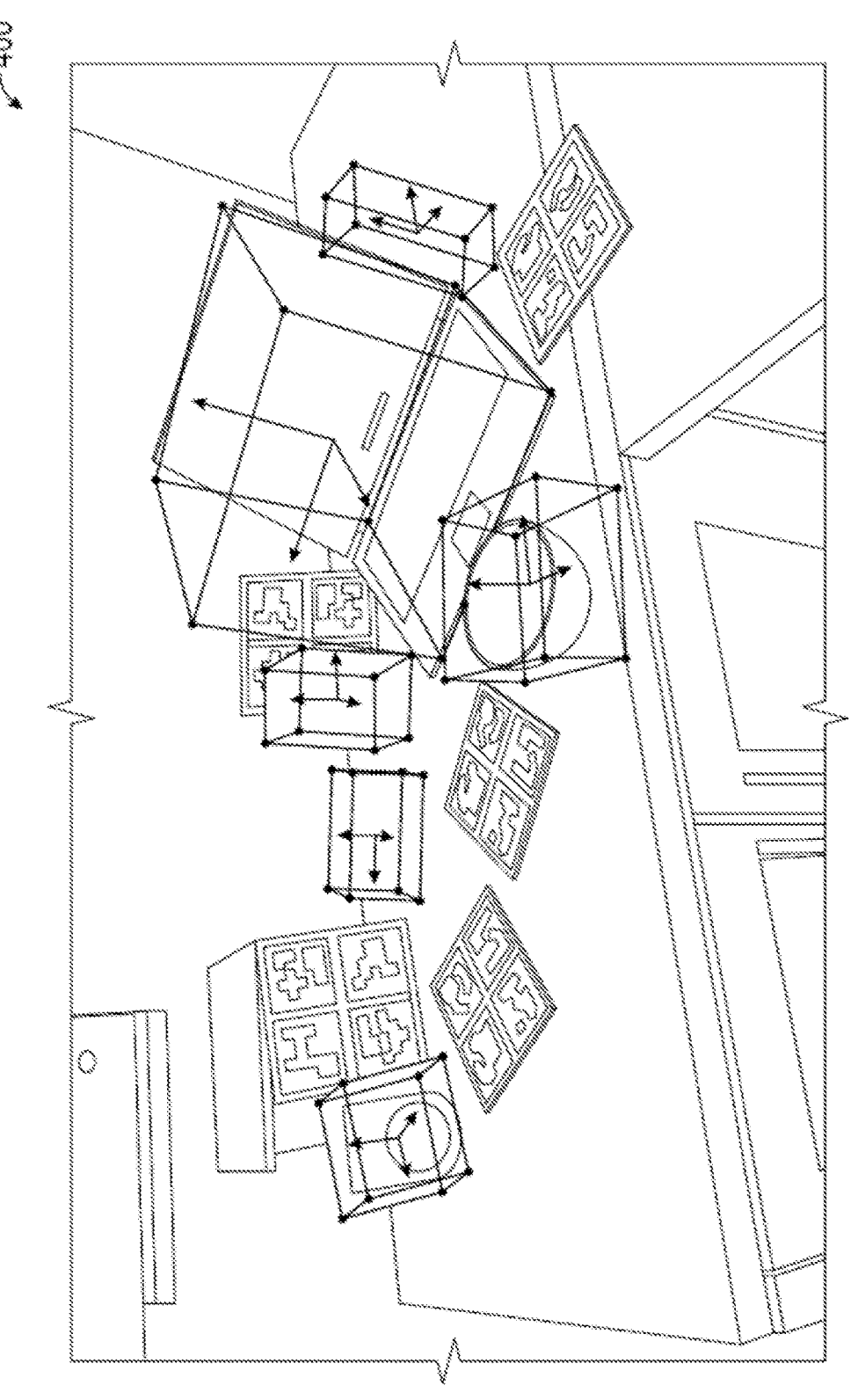
FIG. 4 illustrates objects recognized by the trained machine learning model, in accordance with various examples of the technology described herein.

FIG. 4 illustrates objects recognized by the trained machine learning model, in accordance with various examples of the technology described herein. In example 400, the system may be trained using the first stage, second stage, and third stage training process described herein. The trained ML model may be provided to vehicle 100 of FIG. 1 or other robotic device to perform an inference process on a set of objects in a second image. The inference process may, among other processes, detect 2D locations of the set of objects in the second image, predict a 3D shape of an object in the set of objects, predict a pose of the object in the set of objects, predict a size of the object in the set of objects, and adjust operation of the vehicle based on the inference.

FIG. 5 is an example process that may be used to implement various features of examples described in the present disclosure. In example 500, 6D pose and size estimator system 170 illustrated in FIG. 1 may perform various functions described herein. In some examples, the system may perform a series of operations and transmit instructions to vehicles described herein.

At block 510, the process may receive an image corresponding with an autonomous vehicle. The image may be captured by a sensor associated with the device/vehicle to capture images of the environment around the vehicle as well as internal to the vehicle. Information from image sensor can be used to determine information about the surrounding environment.

In some examples, the process may determine image data to evaluate the environment within or surrounding the vehicle. For example, algorithms operating as part of a computer vision module can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

At block 520, the process may initiate a multi-step training of a machine learning model on the image. The multi-stage ML model training process may comprise (1) 2D and 3D supervised ML model training and losses based on synthetic data, (2) 2D supervised ML model training and losses based on a combination of the synthetic data and real-world data, and (3) 3D self-supervised ML model training and losses based on real-world data (e.g., exclusively real-world data without synthetic data). During the second stage and the third stage, 2D labels from the real-world data may be employed without 3D labels.

At block 530, the process may initiate a first stage pre-training, a second stage mixed-training, and a third stage fine-tuning. For example, in the first stage, given an RGB-D image $I \in \mathbb{R}^{h \times w \times 3}$ and depth map $D \in \mathbb{R}^{h \times w}$, the process can infer the 6D pose $\tilde{\mathcal{P}} \in SE(3)$, 1D scale $\tilde{\mathcal{T}} \in \mathbb{R}^1$ and 3D shape (as SDF) for each detected object in the RGB-D image. At the second stage mixed-training process, synthetic data and real-world data are used to train the ML model. During the mixed training, each batch of inputs may comprise a combination of real and synthetic data. While synthetic data points come with 3D labels, real-world data points may not come with the 3D labels. In the third stage fine-tuning process, the training may be implemented exclusively on the real-world data, allowing the model to refine and fine-tune its understanding of real-world 3D structures. In some examples, the fine-tuning on the real-world data relies solely on 2D labels from the real-world data set.

At block 540, the process may extract and fuse features from the image, using a backbone network, by exposing the image to a heatmap head, a segmentation head, a pose head, and a shape head. For example, a backbone network may be implemented to extract features from the input image and produce feature maps at different levels of resolution. In some examples, the backbone network extracts and fuses features from the RGB-D input to generate the feature maps. In some examples, the image is exposed to various head networks to perform different tasks. The task-specific heads may to generate predictions using multiple methods, including a heatmap head, a segmentation head, a pose head, and a shape head. The process may be implemented to jointly predict the heatmap, shape, pose, and category scores for the objects in the image in a single forward pass.

Figure 6:
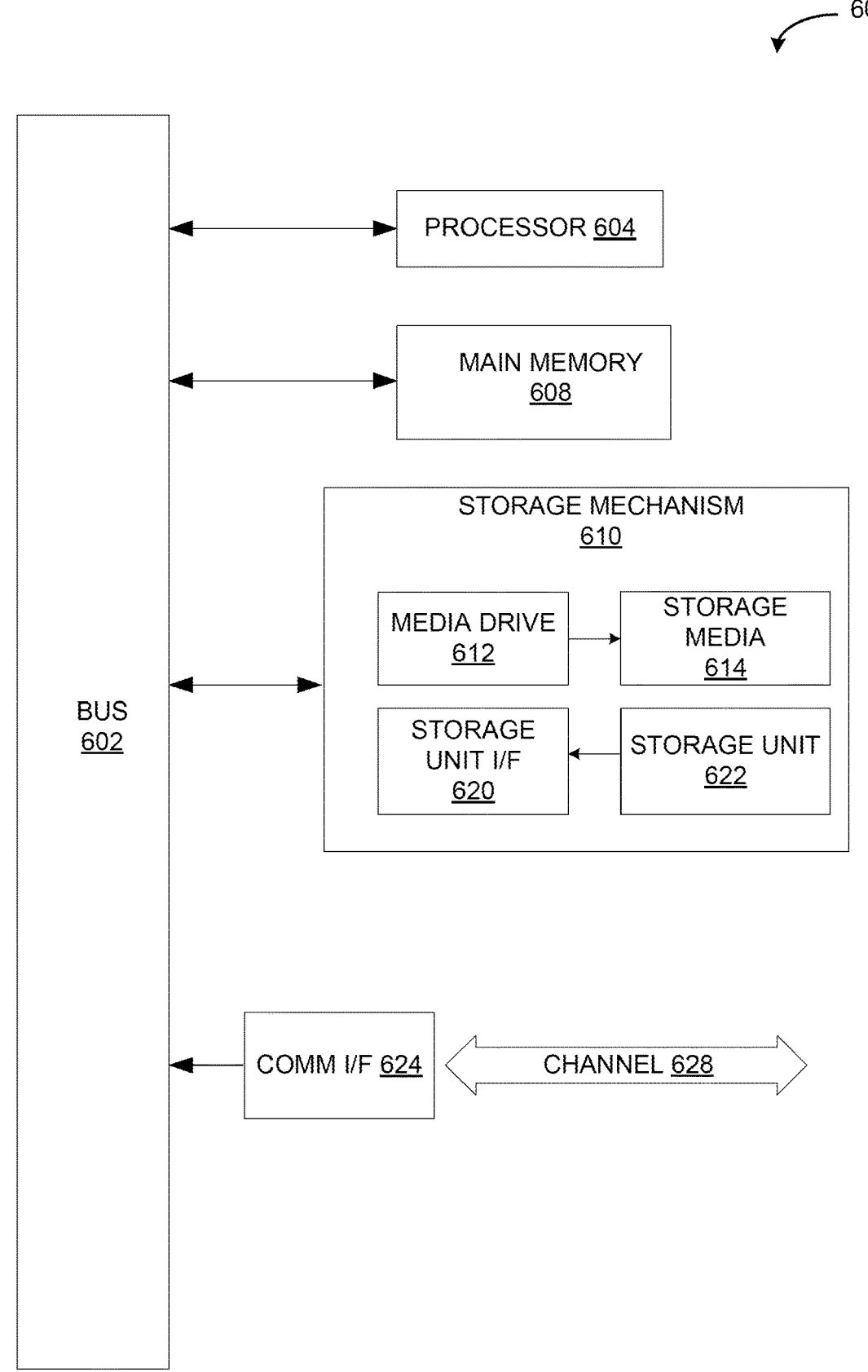
FIG. 6 is an example computing component that may be used to implement various features of examples described in the present disclosure, in accordance with various examples of the technology described herein.

As used herein, the terms circuit and component might describe a given unit of functionality that can be performed in accordance with one or more examples of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various examples are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative examples, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual examples are not limited in their applicability to the particular example with which they are described. Instead, they can be applied, alone or in various combinations, to one or more other examples, whether or not such examples are described and whether or not such features are presented as being a part of a described example. Thus, the breadth and scope of the present application should not be limited by any of the above-described exemplary examples.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various examples set forth herein are described in terms of exemplary block diagrams, flow charts and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

What is claimed is:

1. A computer-implemented method for training a machine learning (ML) model to recognize objects encountered during autonomous or semi-autonomous operations of a vehicle, the method comprising:

receiving an image corresponding with the autonomous or semi-autonomous operations of the vehicle;

initiating a multi-step training of the machine learning model on the image comprising:

initiating a first stage pre-training process based on synthetic data using two-dimensional (2D) supervised machine learning (ML) model training and three-dimensional (3D) self-supervised machine learning (ML) model training;

following the first stage pre-training process, initiating a second stage mixed-training process based on a combination of the synthetic data and real-world data on the 2D supervised ML model training;

following the second stage mixed-training process, initiating a third stage fine-tuning process based on the real-world data without the synthetic data on the 3D self-supervised ML model training; and extracting and fusing features from the image, using a backbone network, by exposing the image to a heatmap head, a segmentation head, a pose head, and a shape head.

2. The method of claim 1, wherein the image is a first image, and the method is further comprising:

upon training the machine learning model on the first image, the machine learning model is provided with an inference process on a set of objects in a second image.

3. The method of claim 2, the inference process on the set of objects in the second image comprising:

detecting 2D locations of the set of objects in the second image;

predicting a 3D shape of an object in the set of objects;

predicting a pose of the object in the set of objects;

predicting a size of the object in the set of objects; and adjusting operation of the vehicle based on the inference.

4. The method of claim 1, wherein a loss is calculated at each of the first stage pre-training process, the second stage mixed-training process, and the third stage fine-tuning process of the multi-step training of the machine learning model associated with two-dimensional (2D) data loss and a three-dimensional (3D) data loss.

5. The method of claim 4, wherein the loss uses a chamfer loss aggregated with the 2D data loss and the 3D data loss.

6. The method of claim 4, wherein the shape head uses a chamfer loss aggregated with the 2D data loss and the 3D data loss.

7. The method of claim 1, wherein during the second stage mixed-training process and the third stage fine-tuning process, 2D labels from the real-world data are employed without 3D labels.

8. The method of claim 1, wherein a ratio of synthetic data in the first stage pre-training process to real-world data during the second stage mixed-training process is adjustable and pre-determined.

9. The method of claim 1, wherein the synthetic data is determined using a learned continuation Signed Distance Function (SDF) representing shapes of different categories.

10. The computer-implemented method of claim 1, wherein the image is a RGB-D image.

11. A system for training a machine learning (ML) model to recognize objects in an image, the system comprising:

a memory; and a processor that is configured to execute machine readable instructions stored in the memory for causing the processor to:

receive the image;

initiate a multi-step training of the machine learning model on the image comprising:

initiating a first stage pre-training process based on synthetic data using two-dimensional (2D) supervised machine learning (ML) model training and three-dimensional (3D) self-supervised machine learning (ML) model training;

following the first stage pre-training process, initiating a second stage mixed-training process based on a combination of the synthetic data and real-world data on the 2D supervised ML model training;

following the second stage mixed-training process, initiating a third stage fine-tuning process based on the real-world data without the synthetic data on the 3D self-supervised ML model training; and extracting and fusing features from the image by exposing the image to a heatmap head, a segmentation head, a pose head, and a shape head.

12. The system of claim 11, wherein the image is a first image, and the instructions stored in the memory further cause the processor to:

upon training the machine learning model on the first image, the machine learning model is provided with an inference process on a set of objects in a second image.

13. The system of claim 12, the inference process on the set of objects in the second image comprising:

detecting 2D locations of the set of objects in the second image;

predicting a 3D shape of an object in the set of objects;

predicting a pose of the object in the set of objects;

predicting a size of the object in the set of objects; and adjusting operation of the vehicle based on the inference.

14. The system of claim 11, wherein a loss is calculated at each of the first stage pre-training process, the second stage mixed-training process, and the third stage fine-tuning process of the multi-step training of the machine learning model associated with two-dimensional (2D) data loss and a three-dimensional (3D) data loss.

15. The system of claim 14, wherein the loss uses a chamfer loss aggregated with the 2D data loss and the 3D data loss.

16. The system of claim 14, wherein the shape head uses a chamfer loss aggregated with the 2D data loss and the 3D data loss.

17. The system of claim 11, wherein during the second stage mixed-training process and the third stage fine-tuning process, 2D labels from the real-world data are employed without 3D labels.

18. The system of claim 11, wherein a ratio of synthetic data in the first stage pre-training process to real-world data during the second stage mixed-training process is adjustable and pre-determined.

19. A non-transitory computer-readable storage medium storing a plurality of instructions executable by a processor, the plurality of instructions when executed by the processor cause the processor to:

receive an image corresponding with autonomous or semi-autonomous operations of a device;

initiate a multi-step training of a machine learning model to recognize objects encountered while the device is operating and depicted in the image, the multi-step training of the machine learning model comprising:

initiating a first stage pre-training process based on synthetic data using two-dimensional (2D) supervised machine learning (ML) model training and three-dimensional (3D) self-supervised machine learning (ML) model training;

following the first stage pre-training process, initiating a second stage mixed-training process based on a combination of the synthetic data and real-world data on the 2D supervised ML model training;

following the second stage mixed-training process, initiating a third stage fine-tuning process based on the real-world data without the synthetic data on the 3D self-supervised ML model training; and extracting and fusing features from the image by exposing the image to a heatmap head, a segmentation head, a pose head, and a shape head.

20. The non-transitory computer-readable storage medium of claim 19, wherein the image is a first image, and the processor is further caused to:

upon training the machine learning model on the first image, the machine learning model is provided with an inference process on a set of objects in a second image.

* * * * *